United States Patent
Dessevre

(10) Patent No.: US 8,366,128 B2
(45) Date of Patent: Feb. 5, 2013

(54) HEAVY VEHICLE TIRE TO DRAW MACHINERY

(75) Inventor: Dominique Dessevre, Chatel-Guyon (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 120 days.

(21) Appl. No.: 13/001,067

(22) PCT Filed: Jun. 22, 2009

(86) PCT No.: PCT/EP2009/057714
§ 371 (c)(1),
(2), (4) Date: Apr. 7, 2011

(87) PCT Pub. No.: WO2009/156356
PCT Pub. Date: Dec. 30, 2009

(65) Prior Publication Data
US 2011/0181010 A1      Jul. 28, 2011

(30) Foreign Application Priority Data
Jun. 24, 2008    (FR) ...................................... 08 54188

(51) Int. Cl.
*E02F 3/76* (2006.01)
(52) U.S. Cl. ......... 280/80.1; 180/61; 180/291; 180/900; 180/908
(58) Field of Classification Search ................ 280/80.1; 180/61, 291, 900, 908
See application file for complete search history.

(56) References Cited

U.S. PATENT DOCUMENTS

| 6,260,873 | B1 | 7/2001 | Bishel |
| 7,147,075 | B2* | 12/2006 | Tanaka et al. ................. 180/229 |
| 7,690,472 | B2* | 4/2010 | Kato et al. .................... 180/291 |
| 7,887,077 | B2* | 2/2011 | Thiers .......................... 280/276 |
| 2003/0040403 | A1 | 2/2003 | Miller |
| 2004/0124029 | A1* | 7/2004 | Takenaka et al. ............. 180/291 |
| 2004/0216942 | A1* | 11/2004 | Tanaka et al. ................. 180/292 |
| 2005/0047901 | A1* | 3/2005 | Eggleston et al. ............ 414/800 |
| 2005/0269796 | A1 | 12/2005 | Sawarynski |
| 2008/0202827 | A1* | 8/2008 | Thiers ......................... 180/6.24 |

* cited by examiner

*Primary Examiner* — Toan To
(74) *Attorney, Agent, or Firm* — Cozen O'Connor

(57) ABSTRACT

A heavy vehicle comprising at least four mounted assemblies, intended to draw machinery. The properties of the vehicle satisfy the relationship:

$$(\rho' - \sqrt{\kappa \cdot (1-\kappa)})^2 + \left(\delta - \frac{h' \cdot \mu}{2}\right)^2 > \left(\frac{h' \cdot \mu}{2}\right)^2,$$

where, $\rho'=\rho/L$, $\rho$ being the turning radius of the vehicle and L being the wheelbase of the vehicle, K is the proportion of the total vertical stiffness under the front axle with respect to the sum of the total vertical stiffnesses under the front and rear axles of the vehicle, $\delta$ is the ratio between the forward offset of the center of gravity and the wheelbase, h' is the ratio between the height of the draft line above the level of ground that forms a horizontal plane and the wheelbase of the vehicle, $\mu$ is the ratio between the longitudinal component of the resistive force applied by the drawn machinery to the vehicle, and the weight of the vehicle.

9 Claims, 2 Drawing Sheets

HEAVY VEHICLE TIRE TO DRAW MACHINERY

RELATED APPLICATION

This is a U.S. National Phase Application under 35 USC 371 of International Application PCT/EP2009/057714, filed on Jun. 22, 2009.

This application claims the priority of French patent application 08/54188 filed Jun. 24, 2008, the entire content of which is hereby incorporated by reference.

FIELD OF THE INVENTION

The present invention relates to a heavy vehicle intended to draw machinery, such as an agricultural tractor intended to draw an implement for working the land.

Although not limited to this application, the invention will be described more specifically with reference to an agricultural tractor.

BACKGROUND OF THE INVENTION

It has become apparent that under certain running conditions, as soon as the implement being drawn begins to apply a not insignificant force resisting forward travel, for example under the effect of an element, such as a disc, of the said implement digging into the ground, the tractor begins to bounce and hop initially causing the driver problems concerned with comfort, and therefore making the driver's work even more difficult, but which could go so far as to cause the tractor problems with making forward progress as the contact periods become too short to provide the friction necessary to allow the tractor to advance over the land, thus causing the said tractor to lose efficiency by degrading the grip of the tyre on the ground concerned.

This bouncing and jolting is characterized by intermittent or almost-sustained oscillations of the rolling assembly at low frequencies usually ranging between 0.5 and 4 Hz, and is known by the name of "power hop".

The solutions that users currently employ involve making the tractor heavier and/or altering the tractor tyre inflation pressure empirically or using interactive methods suggested by the vehicle constructors or the tyre manufacturers. This adjusting of the pressure or of the tractor ballast weight causes the user to lose time and also detracts from the performance of the vehicle because the recommended optimum settings are no longer observed. Excessively high pressures may, for example, lead to greater compaction of loose soil and to even greater resistance to forward travel.

Extensive research conducted by the applicant company into modifications to tyres and, in particular, the meridian profiles of the tread, the meridian profiles of the carcass reinforcement, the carcass and crown reinforcement materials, modifications to the patterns and dimensions of the tread block have not, as yet, yielded the hoped-for improvements because these modifications have little or no impact on the phenomenon as described herein above.

As far as the conventional design of agricultural machinery tyres is concerned, the carcass reinforcement, anchored into each bead, is made up of at least one layer of textile and/or metal reinforcing elements, the said elements being substantially parallel to one another in the layer and potentially being substantially radial and/or distinctly crossed from one ply to the next making equal or unequal angles with the circumferential direction. The carcass reinforcement is usually surmounted by a crown reinforcement made up of at least two working crown layers of reinforcing elements which may be made of textile or of metal, but which are crossed from one layer to the next, making small angles with the circumferential direction. The tread of the tyre in question is formed of rubber blocks or strips which are inclined with respect to the circumferential direction by an angle which is generally high, and which are generally circumferentially separated from one another by hollows of a width (measured in the circumferential direction) that exceeds the average width of the strips. The said strips may be symmetrical with respect to one another about the equatorial plane, being axially continuous or, as in the majority of cases, axially discontinuous. The ends of the strips that are axially close to the equatorial plane are then in most cases circumferentially offset from one another, exhibiting what is commonly known as a chevron pattern.

In patent FR 1 046 427, the applicant company has, for example, described carcass reinforcements in which the directions of the reinforcing elements of the ply or plies in a sidewall are substantially symmetrical about the equatorial plane of the tyre, with the directions of the reinforcing elements of the said ply (plies) in the other sidewall. As disclosed and explained, a ply is to be understood to mean either a ply that is axially continuous from bead to bead, or two half-plies anchored in each bead to an annular bead reinforcing element but the radially upper ends of which are distant from one another and from the equatorial plane.

U.S. Pat. No. 3,108,628 again teaches, with a view to giving the tyre good stability under transverse load, supplementing the radial carcass reinforcement with half-plies known as stabilizing half-plies and which are formed of reinforcing elements that are inclined with respect to the circumferential direction, the said half-plies overlapping at the crown over most of the axial width of the tread so that the reinforcing elements cross one another.

Patent FR 1 259 199 also discloses and describes a directional carcass reinforcement made up of two half-plies of reinforcing elements which are inclined with respect to the circumferential direction so that they overlap at the crown of the tyre to form a crossed reinforcement.

Other documents describe solutions which are not tyre-related but are related to the vehicle and/or to the drawn implement in an attempt to alleviate this bouncing problem.

Document U.S. Pat. No. 6,260,873 describes a device interposed between a tractor and a drawn implement to damp out the tensions that may arise between the tractor and the implement.

Document US 20050269796 describes an optimized suspension system for an agricultural tractor limiting this power hop phenomenon.

The various solutions already proposed do not guarantee full effectiveness on all types of soil or, alternatively, are able only to attenuate, with varying degrees of permanence, the damping of these bouncing phenomena, at the expense of other desired vehicle performance properties.

SUMMARY OF THE INVENTION

One object of the invention is to improve the behaviour of heavy vehicles such as tractors intended to draw machinery and in particular of arriving at heavy vehicles that exhibit little or no bouncing or jolting of the power hop type which is characterized by almost-sustained oscillations of the rolling assembly at low frequencies ranging between 0.5 and 4 Hz, whatever the nature of the terrain on which the vehicle is driving when it is drawing the machinery and without any specific intervention on the vehicle such as altering the inflation pressures or ballasting the vehicle in a special way.

This object has been achieved according to one aspect of the invention directed to a heavy vehicle comprising at least four mounted assemblies, each one consisting of a wheel and a tyre, intended to draw machinery, wherein the properties of the vehicle satisfy the relationship:

$$\left(\rho' - \sqrt{\kappa\cdot(1-\kappa)}\right)^2 + \left(\delta - \frac{h'\cdot\mu}{2}\right)^2 > \left(\frac{h'\cdot\mu}{2}\right)^2,$$

where,
$\rho'=\rho/L$, $\rho$ being the turning radius of the vehicle expressed in meters, and L being the wheelbase of the vehicle, likewise expressed in meters, that is to say the distance, projected onto the ground, between the front axle and the rear axle of the vehicle. $\rho'$ is a dimensionless quantity. The turning radius p is determined using the relationship $p^2 = I_v/m$, $I_v$ being the pitching inertia of the vehicle with respect to a transverse axis (parallel to the axes of the axles) and passing through the centre of gravity of the vehicle, and which is expressed in kg·m², and m being the mass of the vehicle, expressed in kg. $\kappa$ is the proportion of the total vertical stiffness $k_1$ under the front axle with respect to the sum of the total vertical stiffnesses ($k_1+k_2$) under the front and rear axles of the vehicle, $k_1$ and $k_2$ respectively denoting the vertical stiffnesses under the front axle and under the rear axle. The total vertical stiffness under an axle is the resultant of the vertical stiffnesses of the tyres and of the vertical stiffnesses induced by the ground under each of the tyres of the said axle. The vertical stiffness of the tyre is the inherent stiffness of the tyre, that is to say the stiffness measured on non-deformable flat ground.
$\delta$ is the ratio between the forward offset of the centre of gravity and the wheelbase, L of the vehicle, the forward offset of the centre of gravity being defined from a position of the centre of gravity whereby $k_1 \cdot L_1 = k_2 \cdot L_2$, $L_1$ and $L_2$ respectively denoting the distances, projected onto the ground, between the centre of gravity and the front axle, on the one hand, and the rear axle on the other.
$h'$ is the ratio between the height of the draft line above the level of ground that forms a horizontal plane, the vehicle and the drawn machinery being placed in a working position on the said ground that forms a horizontal plane, and the wheelbase L of the vehicle. Within the meaning of the invention, the ground that forms a horizontal plane is firm ground, which means that the heavy vehicle and the drawn machinery do not create any ruts in the said plane when the relevant height is being measured.
$\mu$ is the ratio between the longitudinal component of the resistive force applied by the drawn machinery to the vehicle, and the weight of the vehicle.

As is evident from the foregoing, the parameters $\rho'$, $\kappa$, $\delta$, $h'$, and $\mu$ are dimensionless quantities.

These various characteristics can be measured using any means known to those skilled in the art, including modelling tools.

The wheelbase L can, for example, be measured by projecting the axes of the axles onto the ground. The longitudinal position of the centre of gravity of the vehicle can be deduced from measurements of loading per axle.

The mass m of the vehicle is, for example, determined by weighing the complete tractor (chassis and mounted assemblies).

The pitching inertia Iv can be evaluated experimentally by placing the tractor on a bed, with the transverse axis of the tractor being aligned with the axis of oscillation of the bed. The inertia can also be measured by proceeding as before on each of the subassemblies that make up the tractor as a whole, followed by mathematical calculation (using Huygens' theorem). The pitch inertia can also be quantified by numerical calculation, particularly by recourse to computer assisted calculation (CAC) tools.

Once the parameters L, m and Iv are known, the value of $\rho'$ can be obtained by calculation as explained above:

$$\rho' = \left(\sqrt{\frac{Iv}{m}}\right)/L.$$

The term $\kappa$ can be estimated from the total stiffnesses under the axles:

$$\kappa = \frac{k1}{(k1+k2)},$$

ki being the total stiffness under the axle i with i=1 for the front axle and i=2 for the rear axle. ki is the vertical stiffness of the assembly made up of the tyre and of the ground on which the tyre runs. The stiffness of all the tyres of the axle i is denoted kip (because the tyres work in parallel, their inherent stiffnesses kipj can be summed to give kip). The stiffness kipj of tyre j of axle i is the ratio between the increase in load it bears and the reduction in the height of the centre of the wheel, with the tyre resting on flat horizontal and non-deformable ground and initially, together with the other tyres of the same axle i, bearing the load of the said axle. The stiffness is therefore usually expressed in N/m (Newtons per metre). The stiffness kisj of the ground on which the tyre j of axle i runs is the ratio between an increase in load applied by the said tyre as it passes over this ground and the variation in the depth of the rut thus created. The stiffness kisj is therefore usually expressed in N/m also. If the tyres are running over loose soil, the tyres of the front axle compact the ground as they pass, such that the stiffness of the ground under the rear axle is increased by comparison with that under the front axle. For practical purposes, either the total stiffness under the axle is calculated using the formula $$ki = \left(\left(\sum_j kipj\right)^{-1} + \left(\sum_j kisj\right)^{-1}\right)^{-1},$$

or the ratio between the variation in load applied by the tyres to the ground and the consequent reduction in height of the axis of the axle is measured directly.

The inventors have been able to demonstrate that if all of the characteristics of the vehicle satisfy the abovementioned relationship, then the onset of bouncing or power hop phenomena will be greatly diminished, or even non-existent, notably depending on the terrain over which the vehicle is travelling.

According to a first embodiment of a vehicle according to the invention, $\rho'$ satisfies the relationship $\rho'>0.525$. Such a value of $\rho'$ does actually encourage a reduction in power hop phenomena, the said value of $\rho'$ being able to satisfy the abovementioned relationship. Because $\rho'$ is proportional to the turning radius $\rho$ of the vehicle, the value of $\rho'$ can be modified according to the design of the vehicle, and particularly by choosing the way in which the mass of the elements that make up the vehicle is distributed. By comparison with a conventional vehicle, this embodiment of the invention will also involve keeping the masses that make up the vehicle away from the centre of gravity of this vehicle in order to increase its turning radius.

According to another embodiment of a vehicle according to the invention, ρ' satisfies the relationship ρ'<0.395. Such a value of ρ' is able, as before, to encourage a reduction in power hop phenomena, the said value of ρ' being able to satisfy the above-mentioned relationship. Because ρ' is proportional to the turning radius ρ of the vehicle, the value of ρ' can be modified according to the design of the vehicle and particularly by choosing the way in which the mass of the elements that make up the vehicle is distributed. Unlike in the embodiment set out hereinabove, by comparison with a conventional vehicle, this embodiment of the invention will involve recentering the masses that make up the vehicle about the centre of gravity thereof in a plane containing the vertical direction and the direction of forward travel of the vehicle in order to reduce its turning radius. These masses may, on the other hand, be distributed in the transverse direction of the vehicle.

According to each of these embodiments of a vehicle according to the invention, the variation in the value ρ' makes it possible to modify the first element $(\rho' = \sqrt{\kappa \cdot (1-\kappa)})^2$ of the relationship or inequation given hereinabove and in both instances allows the said relationship to be satisfied.

One advantageous alternative form of the invention stipulates that the height of the sidewalls of the tyres fitted to the rear axle of the vehicle is at least 15% smaller than the height of the sidewalls of the tyres fitted to the front axle of the vehicle.

The height of the sidewall of a tyre has a direct impact on the stiffness of the tyre when it is being used with the said tyre at a given pressure and under a given load. A difference in sidewall height between the tyres fitted to the rear axle of the vehicle and the tyres fitted to the front axle of the vehicle, as proposed in this alternative form of the invention, will play a part in modifying the value δ which is proportional to the forward offset of the centre of gravity, with respect to a reference position of the centre of gravity whereby $k_1 \cdot l_1 = k_2 \cdot l_2$. Because the sidewall height difference proposed in this alternative form of the invention leads to rear tyre sidewall heights that are smaller than those of the front tyres, the stiffness of the rear tyres is increased in relation to that of the front tyres and so the centre of gravity is shifted forwards with respect to the reference position of the centre of gravity, because of the rearward offset of the said reference position of the vehicle when the rear tyres are stiffer in relation to the front tyres.

The difference in value of at least 15% between the sidewall heights of the tyres fitted to the rear axle of the vehicle and the tyres fitted to the front axle of the vehicle, the sidewall heights of the tyres fitted to the rear axle of the vehicle being the shorter heights, allows the value of the second element $$\left(\delta - \frac{h' \cdot \mu}{2}\right)^2$$

of the relationship or inequation set out hereinabove to be set at a level that is high enough for the said inequation to be satisfied.

If the difference in sidewall heights between the tyres fitted to the rear axle of the vehicle and the tyres fitted to the front axle of the vehicle is below 15%, the influence this difference has on the onset of bouncing phenomena is insufficient.

In the case of a vehicle fitted with tyres, the outside diameter of the tyres fitted to the rear axle of the vehicle being the same as the outside diameter of the tyres fitted to the front axle of the vehicle, the tyres fitted to the rear axle have sidewall heights that are smaller than those of the tyres fitted to the front axle; the said tyres are therefore different.

In the case of a vehicle fitted with tyres with outside diameters that differ from one axle to the other, the outside diameter of the tyres fitted to the rear axle of the vehicle is preferably smaller than the outside diameter of the tyres fitted to the front axle of the vehicle.

According to another alternative form of the invention, the height of the sidewalls of the tyres fitted to the rear axle of the vehicle is at least 15% greater than the height of the sidewalls of the tyres fitted to the front axle of the vehicle, and in that the axial width of the treads of the tyres fitted to the front axle of the vehicle is at least equal to the axial width of the treads of the tyres fitted to the rear axle of the vehicle.

The axial or transverse direction of a tyre is parallel to the axis of rotation of the said tyre.

When the vehicle is fitted with twin or triple tyres, within the meaning of the invention, the axial width of the treads of the tyres fitted to one axle is to be understood to mean the sum of the axial widths of all the tyres fitted to the said axle.

The difference in value of at least 15% between the sidewall heights of the tyres fitted to the rear axle of the vehicle and the tyres fitted to the front axle of the vehicle, the sidewall heights of the tyres fitted to the rear axle of the vehicle being the higher, combined with axial widths of the treads of the tyres fitted to the front axle of the vehicle that are greater than or equal to the axial widths of the treads of the tyres fitted to the rear axle of the vehicle, contributes to increasing the value of the second element $$\left(\delta - \frac{h' \cdot \mu}{2}\right)^2$$

of the relationship or inequation set out hereinabove.

Studies have demonstrated that simply having the difference of at least 15% between the sidewall heights when the sidewalls of the tyres fitted to the rear axle of the vehicle are greater is not enough under all circumstances to effectively combat power hop phenomena. Specifically, the increase in the value of the second element of the relationship or inequation then also entails the axial widths of the treads of the tyres fitted to the front axle of the vehicle being greater than or equal to the axial widths of the treads of the tyres fitted to the rear axle of the vehicle. The insufficient difference between sidewall heights, when considered in isolation, can be explained particularly by the limited increase in the total stiffness under the front axle caused by the softness of the ground not compacted as the tyres fitted to the front axle of the vehicle pass, with the said vehicle travelling forwards.

Increasing the axial widths of the treads of the tyres fitted to the front axle by comparison with the axial widths of the treads of the tyres fitted to the rear axle, particularly by comparison with conventional vehicles, makes it possible to increase the stiffness of the ground with respect to the tyres fitted to the front axle of the vehicle; because as the area of the said tyres for contact with the ground increases, the stiffness of the ground as perceived by the front axle of the vehicle increases and contributes towards increasing the total stiffness under the front axle.

In an embodiment of the invention, the wheelbase L of the vehicle to satisfy satisfies the relationship: $L > 1.1 \times (m/d)^{1/3}$, d corresponding to an average density value equal to 300 kg/m³ and m corresponding to the mass of the vehicle, expressed in kg.

Such values of the wheelbase L are able to contribute to decreasing the value of the third element $$\left(\frac{h' \cdot \mu}{2}\right)^2$$

of the relationship or inequation set out hereinabove, the value of h' decreasing.

Studies have demonstrated that such wheelbase values which are unconventional for vehicles of the tractor type do actually encourage the power hop phenomena to disappear by comparison with tractors with a more conventional wheelbase running under the same conditions.

The various embodiments and/or alternative forms of the invention given hereinabove are more particularly suited to the case of an agricultural tractor drawing an implement for working the land which puts up a great deal of resistance to forward travel, such as a disc cultivator.

BRIEF DESCRIPTION OF THE DRAWINGS

Other details and advantageous features of the invention will become evident hereinafter from the description of one exemplary embodiment of the invention, with reference to FIGS. 1 and 2 which depict.

DETAILED DESCRIPTION OF DRAWINGS

For ease of understanding, the figures are not drawn to scale.

Figure 1:
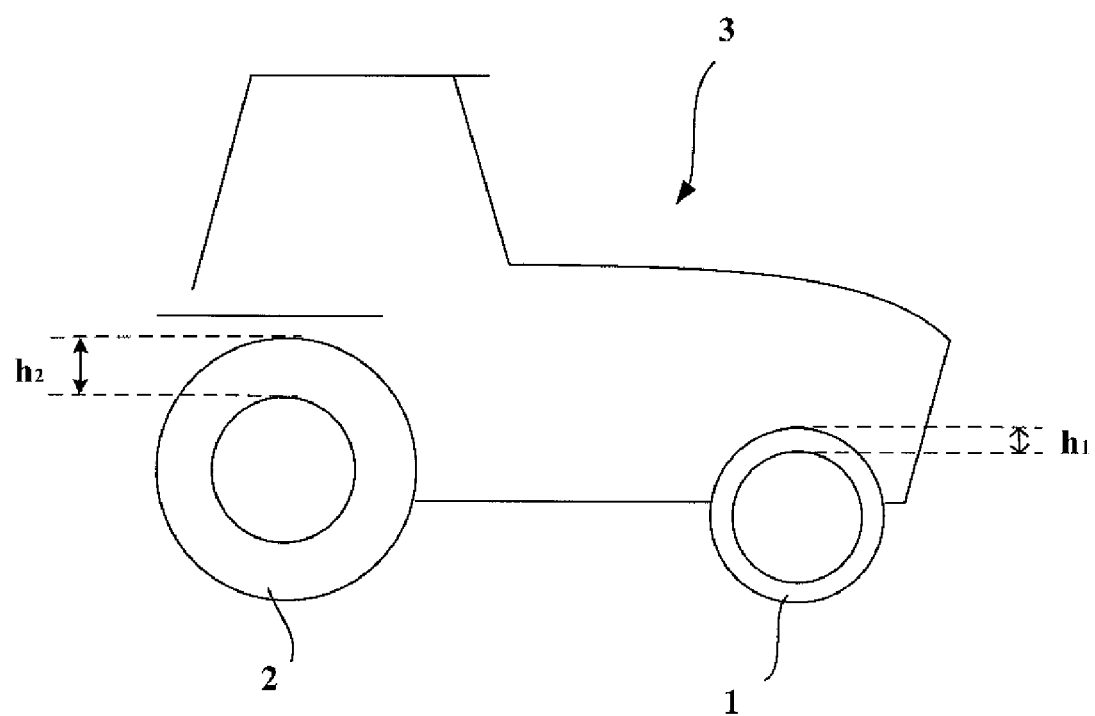
FIG. 1: a schematic depiction of a vehicle according to a first embodiment of the invention.

In FIG. 1, the vehicle schematically depicted is an agricultural tractor 3 of the 4-wheel drive type, provided with an engine developing a power of 125 kW and with an unladen weight of 8660 kg. The tractor 1 is fitted on the front axle with tyres 1 of a size 500/65R34 which therefore have sidewalls of a height $h_1$ equal to 325 mm (500×0.65) and on the rear axle with tyres 2 of a size 480/80R46 Agribib therefore having sidewalls of a height $h_2$ equal to 384 mm (480×0.80).

The sidewalls of the tyres 2 fitted to the rear axle are therefore 18.2% taller than the sidewalls of the tyres 1 fitted to the front axle.

Moreover, according to the invention, the tyres 1 fitted to the front axle have a tread width of 450 mm, greater than the tread width of the tyres 2 fitted to the rear axle which is itself 432 mm.

Tests have shown that a conventional tractor fitted out in accordance with the description of FIG. 1, is able to reduce the onset of power hop phenomena on certain types of terrain by comparison with a same reference tractor fitted more conventionally with tyres, the treads of which are wider on the rear axle.

In the case of the tractor fitted with tyres according to the invention and in the case of the reference tractor, the tractor and the drawn machinery were identical and drove over identical ground. The drawn machinery was a tined cultivator.

Tests were carried out at various tyre inflation pressures, notably to cover all the inflation pressures observed to be used by farmers and take account of all the situations in which the power hop phenomenon can arise.

The tests were carried out on wheat field stubble with one or two passes over the same area in order to reproduce what a farmer actually does, the second pass being intended to complete the ploughing-in of the undesirable vegetation.

The results revealed that the invention is able effectively to limit or even eliminate this power hop phenomenon under certain circumstances. Specifically, whatever the running conditions, it became apparent that, by comparison with the reference tractor, the tractor according to the invention gave acceptable comfort and traction conditions when the reference tractor displayed either a level of comfort that was unacceptable to the driver or an unacceptable lack of traction as a result of the power hop phenomenon.

Modelling techniques also demonstrate that different designs of tractor could further contribute towards causing the power hop phenomena to disappear.

A first design involved concentrating the mass of the tractor around the centre of gravity in order to arrive at a ρ' value of 0.38. The ρ' value calculated for the tractor of FIG. 1 is equal to 0.43, the mass of the tractor being equal to 18321 kg, its inertia to 14400 kg·m² and its wheelbase equal to 3 m.

Tests performed by modelling demonstrated that such a vehicle, with a ρ' value of 0.38, fitted with tyres according to the description of FIG. 1, exhibited practically no more power hop phenomenon irrespective of the nature and type of terrain on which the vehicle was moving.

A second design on the other hand involved moving the mass of the tractor away from the centre of gravity of the tractor in order to obtain a ρ' value of 0.55.

Tests performed by modelling showed, as in the case of the first design, that such a vehicle, with a ρ' value of 0.55, fitted with tyres according to the description of FIG. 1, exhibited practically no more power hop phenomenon irrespective of the nature and type of terrain over which the vehicle was moving.

Figure 2:
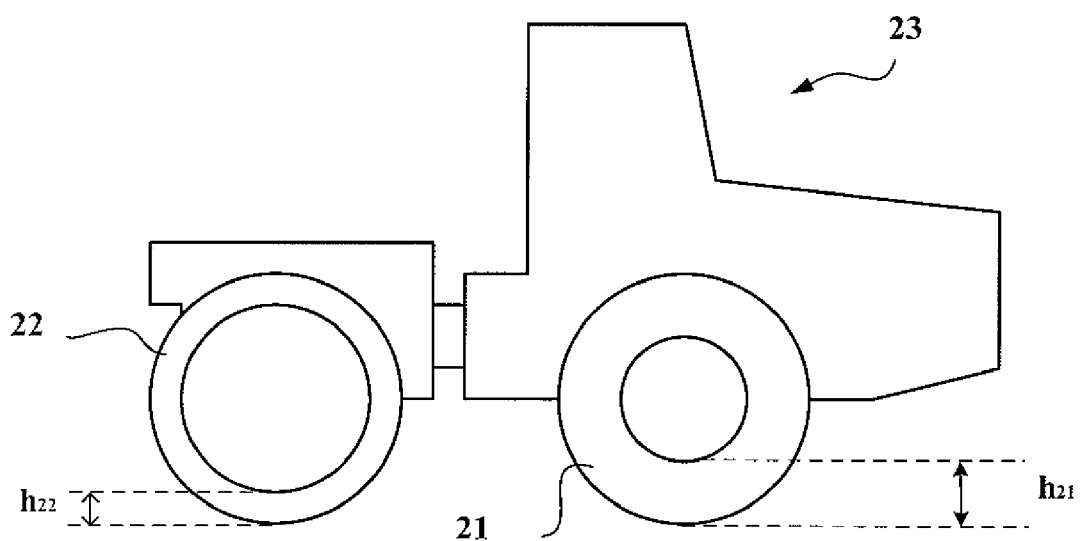
FIG. 2: a schematic depiction of a vehicle according to a second embodiment of the invention.

FIG. 2 depicts a vehicle 23 the tyres 21, 22 of which have the same outside diameters. The tyres 21 fitted to the front axle are of a size 710/70R38 mounted twinned (4 tyres on the axle) and the tyres 22 fitted to the rear axle are of a size 710/40R54, mounted twinned (4 tyres on the axle).

The sidewalls of the tyres 21 fitted to the front axle have a height $h_{21}$ equal to 497 mm (710×0.70) and the sidewalls of the tyres 22 fitted to the rear axle have a height $h_{22}$ equal to 284 mm (710×0.40).

The sidewalls of the tyres 22 fitted to the rear axle are therefore 43% smaller than the sidewalls of the tyres 21 fitted to the front axle.

The tests carried out, similar to those described with reference to FIG. 1, with a vehicle having tyres all with the same outside diameters and in accordance with the description of FIG. 2 showed a reduction in the onset of power hop phenomena on certain types of terrain by comparison with the same vehicle equipped more conventionally with tyres that are completely identical.

The modelling techniques were also able to demonstrate that different designs of the vehicle, similar to the two designs set out with reference to FIG. 1, could again contribute towards causing the power hop phenomena to disappear for a vehicle like the one described in the case of FIG. 2, irrespective of the type of terrain.

The invention claimed is:

1. A heavy vehicle comprising at least four mounted assemblies, intended to draw machinery, wherein the properties of the vehicle satisfy the relationship:

$$(\rho' - \sqrt{\kappa \cdot (1-\kappa)})^2 + \left(\delta - \frac{h' \cdot \mu}{2}\right)^2 > \left(\frac{h' \cdot \mu}{2}\right)^2,$$

where,
- $\rho'=\rho/L$, $\rho$ being the turning radius of the vehicle and L being the wheelbase of the vehicle,
- $\kappa$ is the proportion of the total vertical stiffness under the front axle with respect to the sum of the total vertical stiffnesses under the front and rear axles of the vehicle,
- $\delta$ is the ratio between the forward offset of the centre of gravity and the wheelbase,
- h' is the ratio between the height of the draft line above the level of ground that forms a horizontal plane and the wheelbase of the vehicle,
- $\mu$ is the ratio between the longitudinal component of the resistive force applied by the drawn machinery to the vehicle, and the weight of the vehicle.

2. The heavy vehicle according to claim 1, wherein $\rho'$ satisfies the relationship:

$\rho' > 0.525$.

3. The heavy vehicle according to claim 1, wherein $\rho'$ satisfies the relationship:

$\rho' > 0.395$.

4. The heavy vehicle according to claim 1, wherein the height of the sidewalls of the tyres fitted to the rear axle of the vehicle is at least 15% smaller than the height of the sidewalls of the tyres fitted to the front axle of the vehicle.

5. The heavy vehicle according to claim 4, wherein the outside diameter of the tyres fitted to the rear axle of the vehicle is the same as the outside diameter of the tyres fitted to the front axle of the vehicle.

6. The heavy vehicle according to claim 4, wherein the outside diameter of the tyres fitted to the rear axle of the vehicle is smaller than the outside diameter of the tyres fitted to the front axle of the vehicle.

7. The heavy vehicle according to claim 1, wherein the height of the sidewalls of the tyres fitted to the rear axle of the vehicle is at least 15% greater than the height of the sidewalls of the tyres fitted to the front axle of the vehicle, and in that the axial width of the treads of the tyres fitted to the front axle of the vehicle is at least equal to the axial width of the treads of the tyres fitted to the rear axle of the vehicle.

8. The heavy vehicle according to claim 1, wherein the wheelbase L of the vehicle satisfies the relationship:

$L > 1.1 \times (m/d)^{1/3}$, where,
- m is the mass of the vehicle expressed in kg,
- d is an average density equal to 300 kg/m$^3$.

9. The heavy vehicle according to claim 1, wherein the heavy vehicle is an agricultural tractor and in that the drawn machinery is an implement for working the land.

* * * * *